United States Patent
Schaeferle

(10) Patent No.: US 11,883,253 B2
(45) Date of Patent: Jan. 30, 2024

(54) TOOTH LOOSENING DEVICE

(71) Applicant: Matthew Schaeferle, Centerburg, OH (US)

(72) Inventor: Matthew Schaeferle, Centerburg, OH (US)

(*) Notice: Subject to any disclaimer, the term of this patent is extended or adjusted under 35 U.S.C. 154(b) by 0 days.

(21) Appl. No.: 17/217,872

(22) Filed: Mar. 30, 2021

(65) Prior Publication Data

US 2021/0322133 A1 Oct. 21, 2021

Related U.S. Application Data

(60) Provisional application No. 63/001,704, filed on Mar. 30, 2020.

(51) Int. Cl.
*A61C 3/16* (2006.01)

(52) U.S. Cl.
CPC .................. *A61C 3/166* (2013.01)

(58) Field of Classification Search
CPC .... A61C 3/00; A61C 3/10; A61C 3/14; A61C 3/16; A61C 3/162; A61C 3/166
See application file for complete search history.

(56) References Cited

U.S. PATENT DOCUMENTS

| | | | |
|---|---|---|---|
| 427,275 A | 5/1890 | Siddall | |
| 4,594,069 A * | 6/1986 | Thompson | A61C 3/16 433/161 |

FOREIGN PATENT DOCUMENTS

| | | |
|---|---|---|
| CN | 201019851 Y | 2/2008 |
| WO | WO 03/105714 | 12/2003 |

OTHER PUBLICATIONS

Ideal Dental Blog post https://www.myidealdental.com/blog/a-guide-to-pull-out-a-loose-tooth-without-pain/, Apr. 20, 2021, author unknown.
Pinterest entry https://www.pinterest.it/pin/521291725595088935/visual-search/?x=16&y=8&w=530&h=272 Date unknown, author unknown.
Medkon Healthcare Product, "Forceps for removing loose teeth London College" http://dental.medkoncare.com/index.php?route=product/product&path=391_491_495&product_id=5927 Date unknown, Author unknown.

* cited by examiner

*Primary Examiner* — Cris L. Rodriguez
*Assistant Examiner* — Drew S Folgmann
(74) *Attorney, Agent, or Firm* — GT Patents; Guy V. Tucker

(57) ABSTRACT

A tooth loosening device comprises a body having a tooth contacting portion connected to a handling portion. The tooth contacting portion has a tooth contacting member including one or more surfaces adapted to contact a tooth, and the handling portion includes a manipulation member. The tooth contacting portion can be inserted into a mouth having a tooth in need of loosening, and the manipulation member can position the tooth contacting member so that the one or more surfaces contacts the tooth in need of loosening. The tooth in need of loosening can then be loosened by manipulation of the tooth loosening device. A vibrating mechanism can also be provided to apply vibration to the tooth in need of loosening.

19 Claims, 4 Drawing Sheets

TOOTH LOOSENING DEVICE

PRIORITY

The present application claims the benefit of domestic priority based on United States Provisional Patent Application 63/001,704 filed on Mar. 30, 2020, the entirety of which is incorporated herein by reference.

BACKGROUND

The loss of a child's baby teeth can be a difficult process for the child. It is sometimes painful and scary, and it can often be a constant obsession for the child. On the other hand, a loose tooth can be dangerous if neglected.

Baby teeth, also commonly known as deciduous teeth, milk teeth, primary teeth, and temporary teeth, are the first set of teeth in the growth development of humans. Baby teeth usually erupt during infancy and are lost and replaced by permanent teeth during the development of the child. As the erupting permanent teeth, or adult teeth, push on the roots of the baby teeth, they cause the baby teeth's roots to resorb and become dissolved. This process of shedding baby teeth and their replacement by permanent teeth is called exfoliation and typically occurs from about age six to about age twelve.

Baby teeth are connected to their surrounding bone and gum by periodontal ligaments which are sometimes called periodontal fibers. Each of the 20 baby teeth a child has will have an associated permanent tooth that will erupt to displace it. Ideally, the permanent tooth forms at the right time and in the perfect location. In addition, it is desirable that as the permanent tooth erupts, it will resorb the baby tooth's root evenly so that it comes in straight when the baby tooth comes out of the child's mouth. Unfortunately, this is not always the case. Often, especially with the baby molars that have multiple roots, an aspect of the process is not ideal, and this makes it difficult and painful for the child to work a tooth out on his or her own. If the child or the child's parent does not actively work on removing the loose baby tooth, there are several potentially undesirable outcomes that can result. For example, the permanent tooth may not fully erupt, erupt improperly, develop cavities if bacteria get under the baby tooth, develop painful gum infections, and/or cause psychological trauma. It is not uncommon for a child's parents to eventually make a decision to force a child to have the tooth removed at home or have a dentist remove it or suffer the many consequences that will inevitably come from retained baby teeth.

There are many misconceptions and many sources of bad advice on painless ways to remove a baby tooth. In addition, there are no effective and specific devices currently available that perform the uncomfortable and frightening procedure of extracting a tooth at home. A child typically resorts to wiggling the tooth with his or her finger which is not the most hygienic approach. Few other than dental professionals understand the relationship of the physical living connection that holds a tooth to the gum, even when the roots of a baby tooth have been completely dissolved. The process is even more confusing when the body is able to reattach the remaining tooth structure by healing the ligaments that hold a loose baby tooth in place.

There is therefore a need for a device that assists in the loosening of a tooth in need of being loosened. There is further a need for a tooth loosening device that provides for an improved tooth loosening process. There is further a need for a tooth loosening device that is safe. There is further a need for a tooth loosening device that encourages a child to perform a tooth loosening process.

SUMMARY

The present invention satisfies these needs. In one aspect of the invention, a tooth loosening device is provided.

In another aspect of the invention, a tooth loosening device is used to provide an improved tooth loosening process.

In another aspect of the invention, a tooth loosening device includes one or more safety features.

In another aspect of the invention, a tooth loosening device encourages a child to perform and/or to continue to perform a tooth loosening process.

In another aspect of the invention, a tooth loosening device allows for a tooth loosening process to be performed in a safe, convenient, and effective manner.

In another aspect of the invention, a tooth loosening device allows for a tooth loosening process to be performed in a safe, convenient, and effective manner and in a manner that encourages the process to be performed over an extended period of time.

In another aspect of the invention, a tooth loosening device includes one or more tooth contacting surfaces on a tooth interfacing structure.

In another aspect of the invention, a tooth loosening device includes one or more tooth contacting surfaces on a tooth interfacing structure that is sized and shaped to desirably contact the tooth to be loosened and to improve the grip on the loose tooth and/or provide additional force applying options for loosening the tooth.

In another aspect of the invention, a tooth loosening device includes one or more tooth contacting surfaces on a tooth interfacing structure in the form of a projection, hook, recess, bump, ridge, or the like that is designed to improve the manner in which the tooth loosening device interfaces with the tooth that is to be loosened.

In another aspect of the invention, a user grasp a manipulation member of a tooth loosening device and inserts a tooth contacting portion into the child's mouth so the tooth contacting portion contacts a tooth that needs to be loosened or further loosened, and the user manipulates the tooth loosening device 100 in a manner that causes the contacted tooth to move to help facilitate the loosening or the further loosening of the tooth.

In another aspect of the invention, a tooth loosening device provides a tool that can help a user loosened a tooth that needs to be loosened by slowly and gently break the ligaments that are holding the tooth to the gum by manipulating the tooth without the need to contact the tooth with a finger as often as previously necessary.

In another aspect of the invention, a tooth loosening device includes one or more features that additionally assist in loosening a tooth and/or improving operation or comfort, such as a vibration mechanism.

In another aspect of the invention, a tooth loosening device includes one or more features that additionally assist in loosening a tooth and/or improving operation or comfort, such as a vibration mechanism and a timer.

In another aspect of the invention, a tooth loosening device comprises a body having a tooth contacting portion connected to a handling portion, the tooth contacting portion comprising a tooth contacting member including one or more surfaces adapted to contact a tooth, and the handling portion comprising a manipulation member, wherein the tooth contacting portion can be inserted into a mouth having a tooth in need of loosening, wherein the manipulation member is adapted to position the tooth contacting member so that the one or more surfaces contacts the tooth in need of loosening, and wherein the tooth in need of loosening can be loosened by manipulation of the tooth loosening device.

In another aspect of the invention, A tooth loosening device comprises a body having a tooth contacting portion connected to a handling portion, the tooth contacting portion comprising a tooth contacting member including one or more surfaces adapted to contact a tooth, and the handling portion comprising a manipulation member, and a vibrating mechanism capable of vibrating the tooth contacting member, wherein the tooth contacting portion can be inserted into a mouth having a tooth in need of loosening and can contact the tooth in need of loosening while vibrating.

In another aspect of the invention, a method of loosening a tooth comprises providing a tooth loosening device comprising a body having a tooth contacting portion connected to a handling portion, the tooth contacting portion comprising a tooth contacting member including one or more surfaces adapted to contact a tooth, and the handling portion comprising a manipulation member, inserting the tooth loosening device into a mouth having a tooth in need of loosening, manipulating the tooth loosening device so that the one or more surfaces contacts the tooth in need of loosening, and loosening the tooth in need of loosening by manipulation of the tooth loosening device.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a tooth loosening device. In particular, the invention relates to a tooth loosening device that can be used to assist in the loosening of a baby tooth in a child's mouth. Although the tooth loosening device is illustrated and described in the context of being useful for loosening teeth, the present invention can be useful in other instances. Accordingly, the present invention is not intended to be limited to the examples and embodiments described herein.

Figure 1A:
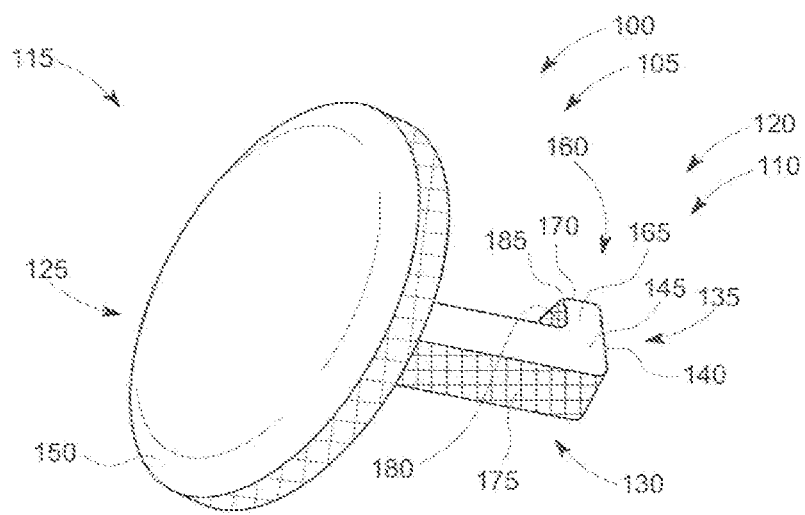
FIG. 1A is a schematic perspective view of a version of a tooth loosening device according to the invention.
Figure 1B:
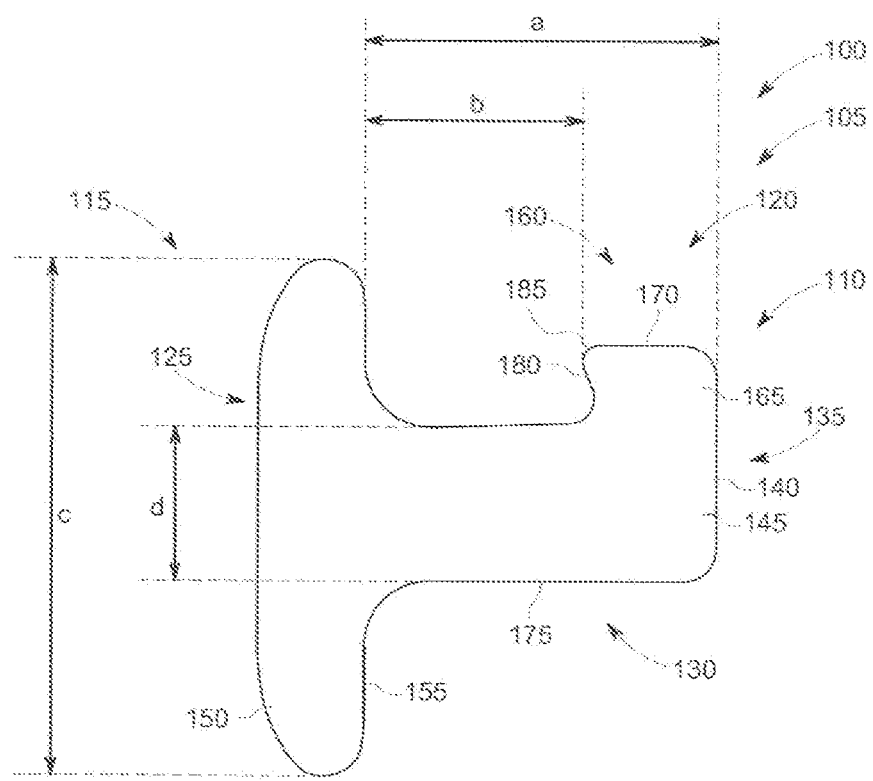
FIG. 1B is a schematic side view of the tooth loosening device of FIG. 1A.

FIGS. 1A and 1B show a tooth loosening device 100 according to a version of the invention. The tooth loosening device 100 includes a body 105 having a first end having a tooth contacting portion 110 and a second end opposing the first end, the second end having a handling portion 115. The tooth contacting portion 110 has a tooth contacting member 120 sized, shaped, and adapted to be inserted into a mouth and to contact at least a portion of a loose tooth or other tooth that is in need of being loosened. The handling portion 115 has a manipulation member 125 that is connected to the tooth contacting member 120 by a shaft portion 130 of the tooth contacting portion 110. The tooth contacting member 120 includes one or more tooth contacting surfaces 135, such as a first end surface 140 and one or more side surfaces 145. In the version shown, the side surfaces 145 can be one or more surfaces of the shaft portion 130 that are capable of contacting a tooth.

A user, such as a child or an adult assisting the child, grasps the manipulation member 125 and inserts the shaft 130 and the tooth contacting member 120 into the child's mouth so the tooth contacting member 120 contacts a tooth that needs to be loosened or further loosened. The user then manipulates the tooth loosening device 100 in a manner that causes the contacted tooth to move to help facilitate the loosening or the further loosening of the tooth. For example, the tooth loosening device 100 can be used to press against, wiggle, twist, and/or apply any similar force to the tooth so that the tooth can be moved horizontally, vertically, diagonally, and/or rotationally about any axes, such as any of three orthogonal axes. The force can be applied by manipulation of the manipulation member 125 and/or any other portion of the tooth loosening device 100. The manipulation member 125 can remain outside the mouth so that a head 150 can be manipulated by the fingers or otherwise by the user. In one version, the head 150 has a cross-sectional dimension greater than a cross-sectional dimension of the shaft portion 130 so that a shoulder portion 155 is formed on the inside surface of the head 150. The shoulder portion 155 can contact the outside of the mouth to help prevent insertion of the manipulation member 125 into the mouth. Alternatively, the manipulation member 125 can be inserted into the mouth during use. In this use, the head 150 can rest between the inside of the cheek and the teeth or gums.

The tooth loosening device 100 can include additional features that are adapted to assist in the tooth loosening process. For example, as shown in the version of FIGS. 1A and 1B, one or more tooth contacting surfaces 135 can be provided on a tooth interfacing structure 160 that is sized and shaped to desirably contact the tooth to be loosened and to improve the grip on the loose tooth and/or provide additional force applying options for loosening the tooth. The tooth interfacing structure 160 can be in the form of a projection, hook, recess, bump, ridge, or the like that is designed to improve the manner in which the tooth loosening device interfaces with the tooth that is to be loosened. For example, in the version of FIGS. 1A and 1B, the tooth interfacing structure 160 comprises one or more projections 165 that extend outwardly, orthogonally, or radially from the shaft portion 130. That is, for a shaft portion 130 having a longitudinal axis, the one or more projections extend in a direction that is not parallel to the longitudinal axis. The projection 165 increases the type and orientation of tooth contacting surfaces 135 that can be used to contact the tooth that is to be loosened. For example, a projection outer surface 170 can be positioned in contact with a tooth to be loosed, and the tooth loosening device 100 can be manipulated in any of several manners to apply force to the tooth, such as by manipulating the manipulation member 125 or any other portion of the body 105 using fingers, the user's tongue, the user's teeth on the opposite jaw, the user's facial muscles, and/or any other implement or body part. A force application surface 175 can be provided on the body 105, such as on the shaft portion 130 on the opposing side of the projection 165. A user can bite against the force application surface 175 to press against and/or otherwise manipulate the tooth being contacted by the tooth interfacing structure 160 or other tooth contacting surface 135. Optionally, the force application surface 175 can be flattened. A projection inner surface 180 may also be provided to provide additional options for contacting the tooth to be loosened. For example, the projection inner surface 180 can be latched around the tooth to contact the inside of the tooth so that the user can force the tooth outwardly by pushing on the tooth contacting portion 110 and/or by pulling on the handling portion 115. Optionally, a hook portion 185 or an inward projection on the projection 165 can be provided to even further improve the grip on the tooth to be loosened.

The tooth loosening device 100 provides a tool that can help a user loosened a tooth that needs to be loosened. A tooth may need to be loosened for many reasons, but one of the most common is for a child that is in the process of having a baby tooth, also known as a deciduous tooth, a milk tooth, a primary tooth, or a temporary tooth, replaced by a permanent tooth, also known as an adult tooth. The tooth loosening device 100 can be used to slowly and gently break the ligaments that are holding the tooth to the gum by manipulating the tooth without the need to contact the tooth with a finger as often as previously necessary. An ideal way for a child to remove a loose baby tooth is to slowly but firmly push the tooth one direction for a sustained period of time, such as several second, and then push it the other way for a sustained period of time, and repeating this back and forth, slowly breaking ligaments a few at a time. It is desirable to perform this process slowly enough to minimize the discomfort but in a convenient enough manner that it can be performed for an extended period of time so that the ligaments do not have time to heal and reattach. The tooth loosening device 100 provides a useful tool for accomplishing this process of tooth loosening in a simple, convenient, and effective manner.

The body 105 of the tooth loosening device 100 can be made from any suitable material and can vary from being rigid to elastically deformable. For example, the body 105 may comprise one or more of rubber, nylon, silicone, plastics, latex, wood, metal, fabrics, paper, cardboard, and the like. In one particular version, the body comprises silicone. The tooth loosening device 100 can, in one version, be made of a single material. Alternatively, the tooth loosening device 100 can have different sections made of different material to improve the performance of each section.

The dimensions of the tooth loosening device 100 can be selected to suit the tooth loosening device 100 for a desired purpose. For example, the length, a, of the tooth loosening device 100 from the inside of the head 150 to the end surface 400 and/or the length, b, from the inside of the head 150 to the inside surface 180 of a projection 165 can be selected to comfortably fit a child's mouth. For example, in one version, the length, a, can range from about 5 mm to about 150 mm and the length, b, can range from about 3 mm to about 140 mm. In one version, the lengths a and b can be selected to provide a universal tooth loosening device 100 that can be used with all of a child's teeth. In this version, the length, a, can range from about 5 mm to about 150 mm, or from about 10 mm to about 40 mm, or about 25, and the length, b, can range from about 3 mm to about 140 mm, or from about 5 mm to about 35 mm, or about 15 mm. In another version, the tooth loosening device 100 may be provided in a kit contained a plurality of tooth loosening devices 100 with each having a different size and/or shape. For example, one tooth loosening device 100 can be sized and shaped to conveniently contact a tooth in the front portion of the mouth and can have a length, a, ranging from about 5 to about 120 mm, or from about 10 to about 30 mm, or about 20 mm, and a length, b, ranging from about 3 mm to about 110 mm, or from about 4 mm to about 25 mm, or about 10 mm. A second loosening device 100 in the kit can be sized and shaped to conveniently contact a tooth in the back portion of the mouth and can have a length, a, greater than the length, a, of the first tooth loosening device 100, such as from about 10 mm to about 150 mm, or about 15 mm to about 45 mm, or about 25 mm, and a length, b, greater than the length, b, of the first tooth loosening device 100, such as from about 3 mm to about 140 mm, or about 5 mm to about 40 mm, or about 15 mm.

In addition, the handling portion 115 and the manipulation member 125 can be sized and shaped as desired. For example, the size of the shoulder portion 155 can be selected so that the shoulder 155 can help prevent insertion of the manipulation member 125 into the mouth, to allow the manipulation member 125 to rest within the mouth between the teeth and gum, and/or to help prevent choking. In this regard, the cross-sectional dimension, c, of the head 150 can range from about 10 mm to about 100 mm, or from about 20 mm to about 60 mm, or about 40 mm. The cross-sectional dimension, d, of the shaft portion 130 near where the shaft portion 130 meets the head 150 can range from about 2 mm to about 20 mm, or from about 5 mm to about 15 mm, or about 10 mm. In one version, the shoulder 155 has a width that is at least about 2 mm, or at least about 15 mm. The above cross-sectional dimensions can be diameters when the head 150 and/or the shaft portion are substantially circular in cross-section. For other shaped cross-sections, the above cross-sectional dimensions can be the largest cross-sectional dimension, the smallest cross-sectional dimension, the average cross-sectional dimension, or an adjusted cross-sectional dimension adjusted to be the equivalent size relative to a circular cross-sectional dimension for the shape.

The body 105 of the tooth loosening device 100 can include additional optional features that can improve its operation. For example, the end surface 140 can be rounded so as to minimize irritation with the tongue. Alternatively, the end surface 140 can be provided with a contour that has a shape that can stimulate interest to the tongue to encourage the user to interact with the end surface 140 and thereby increase the frequency of applying force to the tooth that is to be loosened. Also, the force application surface 175 and/or the tooth contacting surface 134 can be textured with bumps, ridges, slopes, and/or a coating or wrap. The manipulation member 125 of the tooth loosening device 100 can in one version be rounded on the edges and/or flat where it might touch the cheek. The surface of the manipulation member 125 can be smooth or textured and a variety of sizes, shapes, colors, materials, and/or the like.

Figure 2A:
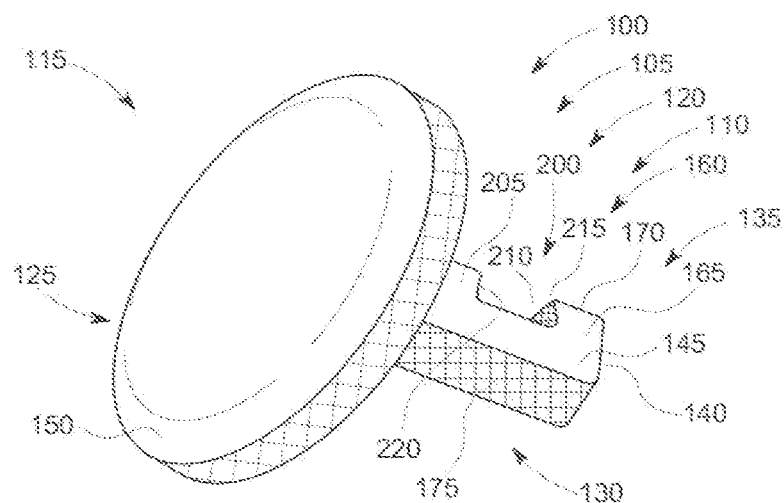
FIG. 2A is a schematic perspective view of another version of a tooth loosening device according to the invention.
Figure 2B:
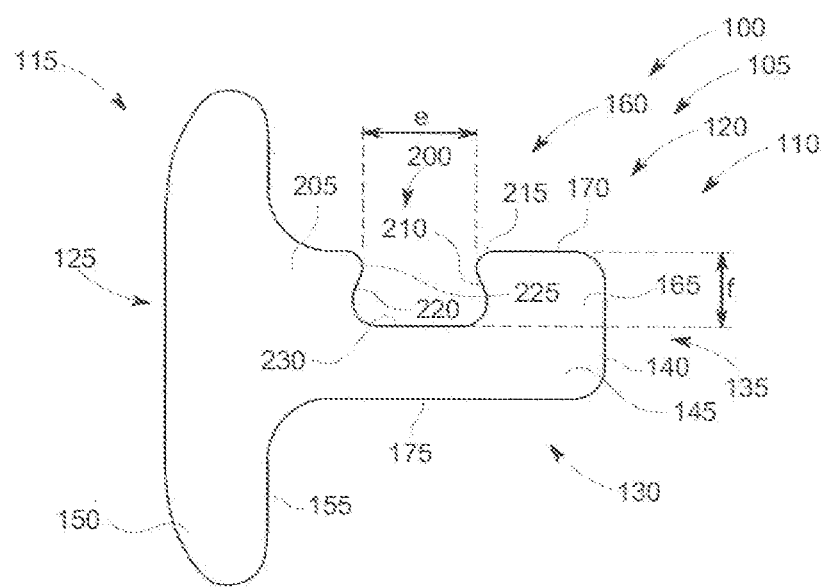
FIG. 2B is a schematic side view of the tooth loosening device of FIG. 2A.

The size and/or shape of the tooth interface structure 160 of the tooth loosening device 100 can also take a variety of forms. For example, FIGS. 2A and 2B illustrate another version of a tooth loosening device 100 where the tooth interface structure 160 is in the form of a notch 200 or depression that extends into the shaft portion 130. The notch 200 can be formed by providing a protrusion 165 as in the version of FIGS. 1A and 1B and adding a second protrusion 205 that is spaced from the first protrusion 165 so as to create a recess that forms the notch 200. The notch has an outer notch wall 210 that can optionally include a hook portion 215 and an inner notch wall 220 that can optionally include a hook portion 225. The outer notch wall 210 and hook 215 can be sized and shaped to contact the inside of a tooth to the loosened in much the same way as the projection inner surface 185 in the version of FIGS. 1A and 1B. In like manner, the inner notch wall 220 and hook 225 can be sized and shaped to contact the outside of the tooth so the tooth can be manipulated in the opposite direction. The length, e, of the notch 200 can be selected to fit snuggly on a tooth or to allow movement of the tooth within the notch 200. In the snug version, the notch 200 can be effective is twisting the tooth. The notch length, e, can range from about 2 mm to about 35 mm, or about 8 mm. The depth, f, of the notch 200 and/or one or both of the first protrusion 165 and the second protrusion 205 can range from about 1 mm to about 15 mm, or about 5 mm. A notch interior surface 230 can contact the bottom of the tooth to be loosened or can be spaced from the tooth.

Figure 3A:
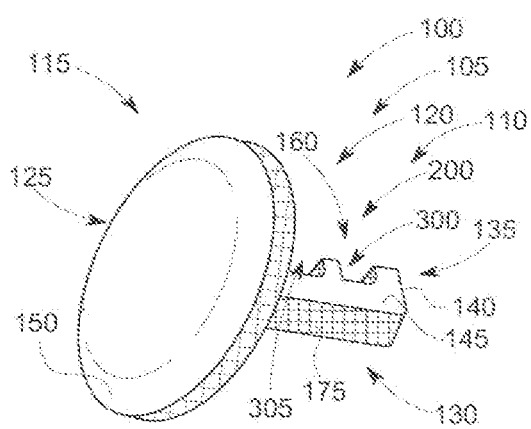
FIG. 3A is a schematic perspective view of another version of a tooth loosening device.
Figure 3B:
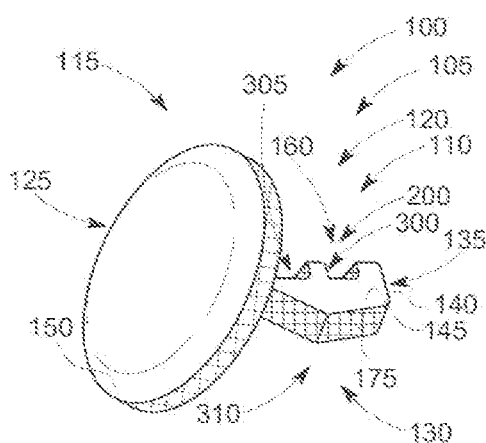
FIG. 3B is a schematic perspective view of another version of a tooth loosening device.
Figure 3C:
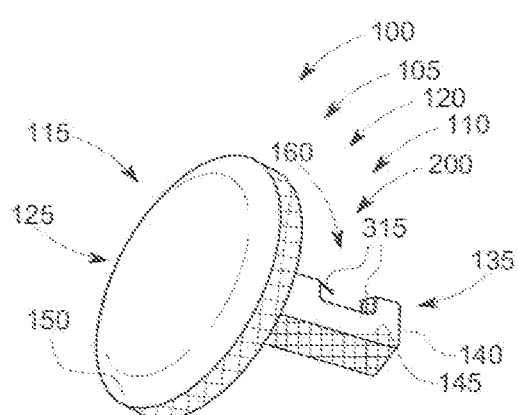
FIG. 3C is a schematic perspective view of another version of a tooth loosening device.
Figure 3D:
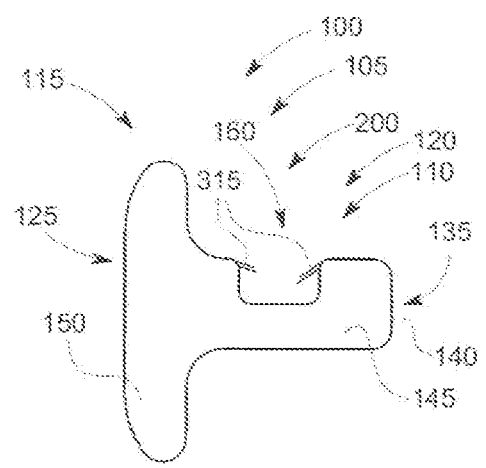
FIG. 3D is a schematic side view of the version of a tooth loosening device of FIG. 3C.
Figure 3E:
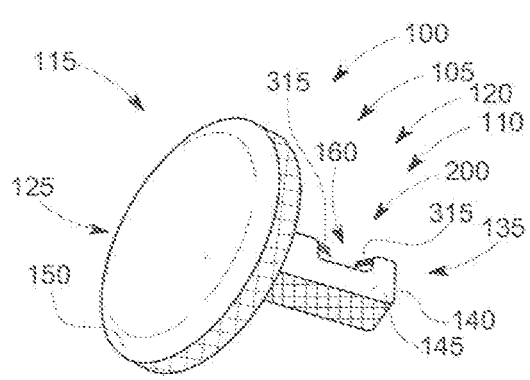
FIG. 3E is a schematic perspective view of another version of a tooth loosening device.
Figure 3F:
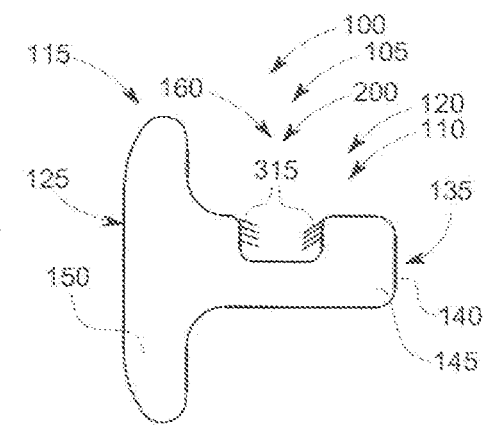
FIG. 3F is a schematic side view of the version of a tooth loosening device of FIG. 3E.

FIGS. 3A through 3F show different versions of tooth loosening devices 100 having different tooth interface structures 160. In the version of FIG. 3A, the tooth interface structure includes a plurality of notches 200, such as a first notch 300 and a second notch 305. The plurality of notches 200 allows for additional force applying options and helps make the tooth loosening device 100 more universally usable for different teeth. In the version of FIG. 3B, the force application surface 175 has an angled portion 310 to allow for better biting contact and to allow different angles of force to be applied to the tooth being loosened. In the version of FIGS. 3C and 3D, a notch 200 includes one or more flexible wings 315 alone one or more of its surfaces. When a tooth is inserted into the notch 200, the flexible wings 315 deform and press against the tooth to help latch the tooth extraction device 100 onto the tooth. The version of FIGS. 3E and 3F is similar to the version of FIGS. 3C and 3D but with multiple wings in the notch 200. In another version, the length of the shaft portion 120 can be adjustable. Each of the features of the various versions described throughout can be used alone or in combination with another feature or portion of a feature.

Figure 4A:
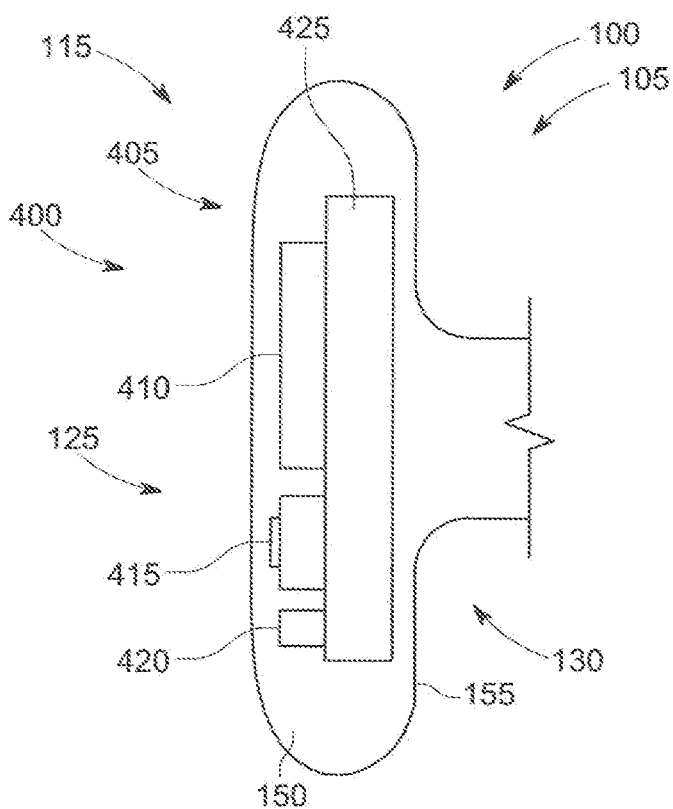
FIG. 4A is a schematic partially sectional side view of another version of a tooth loosening device according to the invention.
Figure 4B:
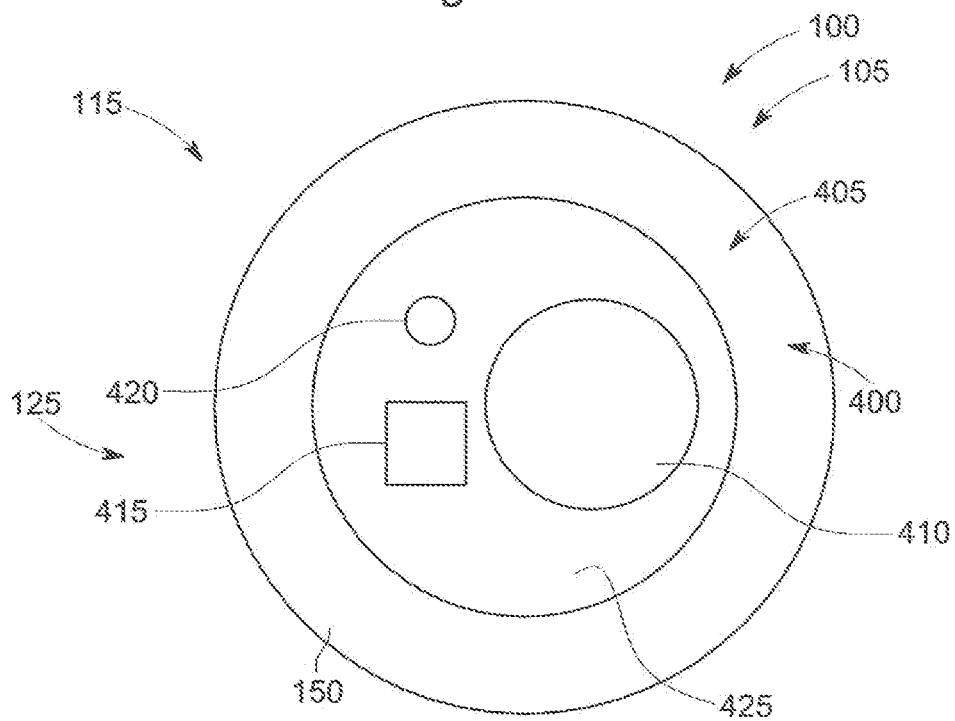
FIG. 4B is a schematic end view of the tooth loosening device of FIG. 4A.

Another version of a tooth loosening device 100 is shown in FIGS. 4A and 4B. FIGS. 4A and 4B show a side view and an end view, respectively, of a handling portion 115 of a tooth loosening device 100. The handling portion 115 can be used with any of the aforementioned tooth contacting portions 110.

The tooth loosening device 100 of FIGS. 4A and 4B can include one or more features 400 that additionally assist in loosening a tooth and/or improving operation or comfort. For example, the tooth loosening device 100 can include a vibration mechanism 405 including a vibrating motor 410, such as a 3 volt flat coin type vibrating motor. The vibration mechanism 405 can cause the tooth loosening device 100 to vibrate so that a vibration is applied to the tooth to be loosened. The vibration helps to distract the nervous system into not being able to feel the discomfort caused by the forces delivered to the tooth under the Gate control theory of pain. In addition, the vibration can help in the loosening of the tooth by breaking individual ligaments. Additional features can be optionally provided, such as an activation button 410 to start and/or stop the vibration, a light 415 or other indicator to indicate that the vibration mechanism is on, and a battery 425 or other power supply. A timer can optionally be provided so that upon actuation, the vibration will occur for a predetermined period of time. For example, the activation button 410 can be used to cycle through various vibrational modes that could be changed by pressing the switch multiple times.

In one version, the main section of the occlusal surface on the shaft portion 130 where the upper and lower teeth rest is from about 3 to about 40 mm, and preferably about 15 mm, from buccal to lingual and from about 2 mm to about 35 mm, preferably about 10 mm mesal to distal. There are two flat surfaces that engage the teeth. The surface on the passive side, or the side opposite to the tooth that is loose, is softer material and/or has bumps or other fixed or adjustable attachments that can be used to push the entire section in all directions. The thickness of this section can be from about 0.5 mm to about 15 mm, preferably about 3 mm. The active side, or the side that is towards the loose tooth, is a hard/smooth main surface that would allow the teeth that are not loose, but on the same arch as the loose tooth, to slide freely. This side also has a section that can be adjusted by the user to grip the loose tooth specifically. The end of the active side towards the lingual has a fixed soft rubber extension that holds the lingual surface of the tooth and the buccal surface of the loose tooth is held by an adjustable soft rubber extension that locks into place by way of a locking mechanism that is unlocked when a button is pressed and then locks in place when the button is released. The size of both the fixed and adjustable extensions can be from about 0.5 mm to about 25 mm, preferably about 5 mm, mesial to distal, from about 0.5 mm to about 20 mm, preferably about 3 mm, buccal to lingual, and from about 0.5 mm to about 20 mm, preferably about 4 mm, cervical to occlusal. The purpose of this design is to put all of the forces from the opposing teeth pressing on the passive side that does not have a loose tooth to push only on the single loose tooth, while at the same time allow the user to not cause too much discomfort when the user bites down.

Additional features can also be provided. For example, an additional feature that can be included is a gel or other substance inside the body 115 that can be chilled in the freezer to provide a numbing effect. Also, the tooth loosening device 100 can include lights, sounds, sparkles, or the like to add excitement and encourage the use of the device. The manipulation member 125 or any other portion of the tooth loosening device 100 can be in the form of an animal, character, or the like and/or can be provided in different colors for added excitement. In addition, the tooth loosening device 100 can be attractively flavored. Additional features can include a longer handle that may or may not have a hole that attaches to a neck lanyard, a wrist strap, or any other attachment. The handling portion 115 can be an a section that extends extraorally and that has a permanent or removable built-in extraoral device that has one or more additional features, such as a vibrating motor, lights, sounds, colors, shapes, designs, tactile grips, and the like.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number, and all directional limitations, such as up and down and the like, can be switched, reversed, or changed as long as doing so is not prohibited by the language herein with regard to a particular version of the invention. Also, the various features of the versions herein can be combined in various ways to provide additional versions of the present invention. Furthermore, certain terminology has been used for the purposes of descriptive clarity, and not to limit the present invention. Throughout this specification and any claims appended hereto, unless the context makes it clear otherwise, the term "comprise" and its variations such as "comprises" and "comprising" should be understood to imply the inclusion of a stated element, limitation, or step but not the exclusion of any other elements, limitations, or steps. Throughout this specification and any claims appended hereto, unless the context makes it clear otherwise, the term "consisting of" and "consisting essentially of" and their variations such as "consists" should be understood to imply the inclusion of a stated element, limitation, or step and not the exclusion of any other elements, limitations, or steps or any other non-essential elements, limitations, or steps, respectively. Throughout the specification, any discussed on a combination of elements, limitations, or steps should be understood to include a disclosure of additional elements, limitations, or steps and the disclosure of the exclusion of additional elements, limitations, or steps. All numerical values, unless otherwise made clear in the disclosure or prosecution, include either the exact value or approximations in the vicinity of the stated numerical values, such as for example about +/− ten percent or as would be recognized by a person or ordinary skill in the art in the disclosed context. The same is true for the use of the terms such as about, substantially, and the like. Also, for any numerical ranges given, unless otherwise made clear in the disclosure, during prosecution, or by being explicitly set forth in a claim, the ranges include either the exact range or approximations in the vicinity of the values at one or both of the ends of the range. When multiple ranges are provided, the disclosed ranges are intended to include any combinations of ends of the ranges with one another and including zero and infinity as possible ends of the ranges. Therefore, any appended or later filed claims should not be limited to the description of the preferred versions contained herein and should include all such alterations, permutations, and equivalents as fall within the true spirit and scope of the present invention.

What is claimed is:

1. A tooth loosening device comprising:
a body having a tooth contacting portion connected to a handling portion, the tooth contacting portion comprising a tooth contacting member including a shaft having a notch that extends into the shaft to form a recess adapted to receive a tooth, the notch forming one or more surfaces adapted to contact the tooth when the tooth is received in the recess, wherein one of the surfaces is an outer wall of the notch, the outer wall of the notch being adapted to contact the lingual side of the tooth when the tooth is received in the recess, and wherein the handling portion comprises a manipulation member, wherein the manipulation member and the tooth contacting portion are connected as a single piece of material,
wherein the tooth contacting portion can be inserted into a mouth having a tooth in need of loosening, wherein the manipulation member is adapted to help position the tooth contacting member so that the tooth in need of loosening is received in the recess, and wherein the tooth in need of loosening can be loosened by manipulation of the tooth loosening device which correspondingly manipulates the outer wall of the notch.

2. A tooth loosening device according to claim 1 wherein the shaft comprises an end surface, an outer surface, and an inner surface, each of which can be used to contact the tooth in need of loosening.

3. A tooth loosening device according to claim 1 wherein the outer wall of the notch comprises a surface with a hook.

4. A tooth loosening device according to claim 1 wherein the notch is formed by a pair of projections that extends outwardly from the shaft portion in the same direction so that the notch is formed between the pair of projections, wherein one of the surfaces is an inner wall of the notch, the inner wall of the notch being adapted to contact the buccal side of the tooth when the tooth is received in the recess.

5. A tooth loosening device according to claim 1 wherein the shaft comprises a force application surface on the side opposite the notch.

6. A tooth loosening device according to claim 5 wherein the force application surface is flattened so it can be bitten on by a tooth other than the tooth in need of loosening.

7. A tooth loosening device according to claim 1 wherein the manipulation member has a cross-sectional dimension along the longitudinal axis of the shaft larger than a corresponding cross-sectional dimension of the shaft.

8. A tooth loosening device according to claim 1 wherein the notch has an inner notch wall that includes a hook portion.

9. A tooth loosening device according to claim 1 wherein the outer wall of the notch includes a hook portion and wherein an inner wall of the notch includes a hook portion.

10. A tooth loosening device comprising:
a body comprising a shaft portion connected to a handling portion, the shaft portion having a tooth contacting portion comprising a tooth contacting member including a first surface adapted to contact a lingual side of a tooth and a second surface adapted to contact a buccal side of the tooth, and the handling portion comprising a manipulation member,
wherein the tooth contacting portion can be inserted into a mouth having a tooth in need of loosening, wherein the manipulation member is adapted to position the tooth contacting member so that the first or second surface contacts the tooth in need of loosening, and wherein the tooth in need of loosening can be loosened by manipulation of the tooth loosening device, and
wherein the manipulation member has a cross-sectional dimension along the longitudinal axis of the shaft portion larger than a corresponding cross-sectional dimension of the shaft portion so that a shoulder portion is formed around the entirety of the manipulation member whereby the manipulation member may be positioned outside the mouth while the shaft portion is inside the mouth, and wherein the shaft portion is made of a single piece of material.

11. A tooth loosening device according to claim 10 wherein the tooth contacting member comprises one or more of a projection, a hook, a bump, and a ridge.

12. A tooth loosening device according to claim 10 wherein the shaft portion comprises a projection and wherein the projection comprises an end surface, an outer surface, and an inner surface, each of which can be used to contact the tooth in need of loosening.

13. A tooth loosening device according to claim 12 wherein the projection comprises an inner surface with a hook.

14. A tooth loosening device according to claim 10 the tooth contacting member comprises a pair of projections that extends outwardly from the shaft portion in the same direction so that a notch is formed between the pair of projections, the notch being adapted to receive the tooth in need of loosening therein.

15. A tooth loosening device according to claim 10 wherein the tooth contacting member comprises a projection that extends outwardly from the shaft portion, and wherein the shaft portion comprises a force application surface on the side opposite the projection, wherein the force application surface is flattened so it can be bitten on by a tooth other than the tooth in need of loosening.

16. A tooth loosening device comprising:
a body having a tooth contacting portion connected to a handling portion, the tooth contacting portion comprising a tooth contacting member including a shaft having a notch that extends into the shaft to form a recess adapted to receive a tooth, the notch forming one or more surfaces adapted to contact the tooth when the tooth is received in the recess, wherein one of the surfaces is an outer wall of the notch, the outer wall of the notch being adapted to contact the inside of the tooth when the tooth is received in the recess, and wherein the handling portion comprises a manipulation member,
wherein the tooth contacting portion can be inserted into a mouth having a tooth in need of loosening, wherein the manipulation member is adapted to help position the tooth contacting member so that the tooth in need of loosening is received in the recess, and wherein the tooth in need of loosening can be loosened by manipulation of the tooth loosening device which correspondingly manipulates the outer wall of the notch, and
wherein the distance between the outer wall of the notch and the manipulation member is fixed by the shaft being made of a single piece of material.

17. A tooth loosening device according to claim 16 wherein the outer wall of the notch comprises a surface with a hook and wherein the notch comprises an inner wall comprising a surface with a hook.

18. A tooth loosening device according to claim 16 wherein the shaft comprises a force application surface on the side opposite the notch, wherein the force application surface is flattened so it can be bitten on by a tooth other than the tooth in need of loosening.

19. A tooth loosening device according to claim 16 wherein the manipulation member has a cross-sectional dimension along the longitudinal axis of the shaft larger than a corresponding cross-sectional dimension of the shaft.

* * * * *